United States Patent Office 2,852,506
Patented Sept. 16, 1958

2,852,506

METHOD OF PREPARING AMINODEOXY-GLYCOSIDOPURINES

Leon Goldman and Joseph W. Marsico, Nanuet, N. Y., assignors to American Cyanamid Company, New York, N. Y., a corporation of Maine No Drawing. Application October 31, 1955
Serial No. 544,085

23 Claims. (Cl. 260—211.5)

This invention relates to a novel method of preparing aminodeoxyglycosidopurines of the formula:

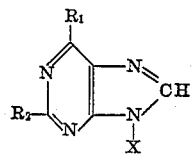

wherein $R_1$ and $R_2$ are members of the group consisting of halogen, hydrogen, alkyl, hydroxyl, alkoxy such as methoxy, ethoxy, propoxy, etc.; aralkyloxy such as benzyloxy; mercapto, alkylmercapto such as methylmercapto, ethylmercapto, etc.; amino, alkylamino such as methylamino, ethylamino, decylamino, etc.; mononuclear arylamino such as p-methoxy phenylamino, etc.; aralkylamino such as benzylamino; heterocyclicalkylamino such as furfurylamino; dialkylamino such as dimethylamino, diethylamino, dipropylamino, etc.; pentamethyleneimino such as piperidyl; oxapentamethyleneimino such as morpholinyl; dialkenylamino such as diallylamino and cycloalkylamino such as cyclohexylamino, etc.; and wherein X is an aminodeoxyglycosido radical, the amino group of which is substituted by a member of the group consisting of hydrogen, acyl and aroyl radicals, and the exocyclic oxygen atoms of which are substituted by a member of the group consisting of hydrogen, acyl and aroyl radicals. The aminodeoxyglycosido radical may be a pentose or hexose, L or D, in either the furanose or pyranose form, and attached either α or β to the 9-position of the purine with the amino or substituted amino group at any one of the available positions.

The aminodeoxyglycosidopurines as new compounds form the subject matter of the copending application of Baker et al., Serial No. 405,236, filed January 20, 1954, now abandoned in favor of a continuation-in-part application Serial No. 544,084, filed October 31, 1955. These new compounds are valuable therapeutic agents in the treatment of Trypanosomiasis, a disease caused by the presence in the body of a parasite of the genus Trypanosoma.

The preparative method for the novel compounds disclosed in the aforesaid copending application involves the condensation of a blocked derivative of a glycoside with a suitably substituted purine. Thus for example, 2,5-di-O-benzoyl-3-phthalimido-3-deoxy-β-D-ribofuranosyl chloride may be condensed with 2-methylmercapto-6-dimethylaminopurine mercuric chloride reaction product in the presence of an inert hydrocarbon solvent to produce 2-methylmercapto-6-dimethylamino-9-(2,5-di-O-benzoyl-3-phthalimido-3-deoxy-β-D-ribofuranosyl)-purine, the methylmercapto group of which may be removed by treatment with Raney nickel and the amino and hydroxy functions of which may then be unblocked to yield the free aminodeoxyglycosidopurine.

According to the present invention, we have now discovered a novel preparative method for these compounds which possesses considerable advantage over the only heretofore known preparative route in that following our procedure much more widely varying $R_1$ and $R_2$ substituted aminodeoxyglycosidopurines may be more conveniently prepared.

Briefly, the present invention involves utilizing as the starting material an aminodeoxyglycosidopurine which is substituted in the $R_1$ and/or $R_2$ positions by a replaceable group such as halogen, i. e. chlorine, bromine, etc. or alkoxy such as methoxy, ethoxy, etc. The so-substituted aminodeoxyglycosidopurine is reacted with a wide variety of nucleophilic reagents such as ammonia, various amines, inorganic bases, etc., which replace the halogen or alkoxy group by a suitable radical in the $R_1$ and $R_2$ positions such as hydroxyl, mercapto, alkylmercapto, amino, alkylamino, etc., as set out hereinbefore.

Thus for example, 6-chloro-9-(2,5-di-O-benzoyl-3-acetamido-3-deoxy-β-D-ribofuranosyl)purine may be reacted with dimethylamine in methanol to yield 6-dimethylamino-9-(3-acetamido-3-deoxy-β-D-ribofuranosyl)purine according to the following equation:

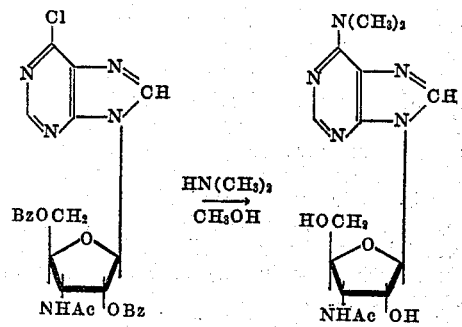

This product may then be deacylated.

This new preparative method possesses considerable advantage over the method disclosed in the aforesaid copending application. Thus in accordance with the method of the copending application, for every variation in the $R_1$ and $R_2$ positions in the aminodeoxyglycosidopurine, the condensation of a specifically substituted purine with an aminosugar is required. This not only is extremely laborious and time consuming, but of necessity limits to a certain degree the type of substituted aminodeoxyglycosidopurine that can be prepared since the substituents on the purine must survive the rather rigorous condensation reaction, and the preponderant overall effect of the substituents must lead to the formation of a 9-substituted aminodeoxyglycosidopurine.

The present method, however, obviates these difficulties. By the new method no longer is it necessary to carry out separate condensation reactions for each variation desired in the final aminodeoxyglycosidopurine. Instead, by using halogen or alkoxy as a replaceable substituent in either the 2- or 6-positions, or both, of an aminodeoxyglycosidopurine, it is possible easily to replace the halogen or alkoxy by the final desired substituent by reaction with an appropriate reagent.

As sources of the aminodeoxyglycosidopurines used as starting materials in the preparative method of this invention, we may use any halogen or alkoxy substituted aminodeoxyglycosidopurines such as those disclosed in the Baker et al. application referred to, or we may use any naturally occurring products.

The process of the present invention is preferably carried out by reacting a compound of the formula:

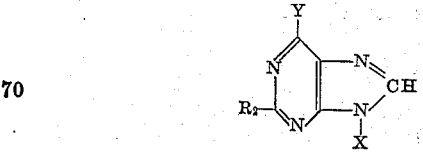

or

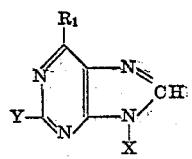

wherein $R_1$, $R_2$ and X are as defined hereinabove, and wherein Y is halogen or alkoxy, with a compound selected from the group consisting of ammonia, aliphatic primary and secondary amines, such as methylamine, ethylamine, propylamine, dimethylamine, diethylamine, dipropylamine, etc., aromatic amines such as p-anisidine, aralkylamines such as benzylamine; heterocyclicalkyl amines such as furfurylamine; oxapentamethyleneimines such as morpholine; pentamethyleneimines such as piperidine; dialkenylamines such as diallylamine; cycloalkylamines such as cyclohexylamine; aralkoxides, alkoxides, and thioalkoxides such as sodium methoxide and sodium thiomethoxide, thiourea and inorganic bases such as sodium hydroxide.

The above described replacement reaction is preferably carried out in a solvent such as anhydrous methanol at a temperature of from 20 to 200° C., although the solvent may be omitted if desired.

Following the replacement reaction, the aminodeoxyglycosidopurines may be either selectively or fully deacylated, if necessary, by methods known to the art. That is to say, selective deacylation (retaining the acyl group on the sugar nitrogen) may be carried out in a solvent such as ethanol or methanol in the presence of a base such as sodium methoxide. If full deacylation is desired, this may be accomplished by the use of a strong base such as sodium hydroxide in the presence of water, as a solvent.

It is also possible to carry out the deacylation reaction as part of the replacement reaction as illustrated in several of the examples which follow.

The invention will be described in greater detail in conjunction with the following specific examples.

EXAMPLE 1

*6-chloro-chloromercuripurine and bis(6-chloropurinyl)-mercury*

50 ml. of 0.4 N sodium hydroxide was heated to 75° C. and 3.091 g. of 6-chlorpurine was added to produce a clear solution. A hot solution of 5.430 g. of mercuric chloride in 15 ml. of ethanol was immediately added with stirring to produce colorless crystals. After chilling the crystals were removed by filtration, washed with water and dried overnight at 100° C. The yield of light tan crystals, analyzing for 15% 6-chloro-chloromercuripurine and 85% bis(6-chloropurinyl)mercury, was 96%.

EXAMPLE 2

*6-chloro-9-(2,5-di-O-benzoyl - 3 - phthalimido-3-deoxy-β-D-ribofuranosyl)purine*

To a stirred, refluxing suspension of 6.84 g. of a mixture of 82.5% bis(6-chloropurinyl)mercury and 17.5% 6-chloro-chloromercuripurine in 350 ml. of anhydrous xylene, was added a hot solution of 11.86 g. of 2,5-di-O-benzoyl - 3 - phthalimido-3-deoxy-β-D-ribofuranosyl chloride in 125 ml. of anhydrous xylene. The resulting suspension was refluxed and stirred for 5 hours and then while hot filtered through Celite. The filter cake was washed with hot chloroform and the combined filtrate and wash were washed twice with 40 ml. portions of 30% potassium iodide and then with water. After drying over magnesium sulfate the solution was concentrated under reduced pressure to give 13.36 g. of 6-chloro-9-(2,5-di-O-benzoyl-3-phthalimido-3-deoxy - D - ribofuranosyl)purine. Recrystallization from ethyl acetate-hexane gave 7.18 g. of colorless crystals of 6-chloro-9-(2,5-di-O-benzoyl-3-phthalimido-3-deoxy-β-D-ribofuranosyl)purine (containing ½ mol of ethyl acetate), which sinters at 76–77° C. to an opaque glass, melts at 100–105° C. to a clear glass; $[\alpha]_D^{24}$ −60.9° (chloroform), $\lambda_{max.}^{0.1 N HCl}$ 263 mμ (ε12,100); $\lambda_{max.}^{ethanol}$ 263 mμ (ε10,700); $\lambda_{max.}^{0.1 N NaOH}$ 263 mμ (ε10,700)

EXAMPLE 3

*6-chloro-9-(2,5-di-O-benzoyl - 3 - acetamido-3-deoxy-D-ribofuranosyl)purine*

To a stirred mixture of 7.45 g. of 1-O-acetyl-2,5-di-O-benzoyl-3-acetamido-3-deoxy-D-ribofuranose and 5.85 g. of a mixture of 82.5% bis(6-chloropurinyl)mercury and 17.5% of 6-chloro-chloromercuripurine in 325 ml. of anhydrous ethylene dichloride at room temperature, was added dropwise 2.32 ml. of titanium tetrachloride. The resulting suspension was stirred and refluxed for 20 hours. The stirred mixture was chilled and 300 ml. of cold 0.1 N hydrochloric acid added in four portions. Stirring was continued for 15 minutes at room temperature and the mixture was filtered. The precipitate was washed well with hot chloroform and the combined filtrate and washings were shaken well and the layers separated. The organic phase was washed with 60 ml. of water, 60 ml. of 30% potassium iodide, and 60 ml. of water and dried over magnesium sulfate. The dried organic solution was evaporated under reduced pressure to yield 7.77 g. (85%) of 6-chloro-9-(2,5-di-O-benzoyl-3-acetamido-3-deoxy-D-ribofuranosyl)purine as a light tan glass; $[\alpha]_D^{24.5}$ +39.2° (ethanol);

$\lambda_{max.}^{0.1 N HCl}$ 233 mμ (ε27,500), 265 mμ (ε7,890); $\lambda_{max.}^{ethanol}$ 230 mμ (ε28,400), 264 mμ (ε8,300); $\lambda_{max.}^{0.1 N NaOH}$ 265 mμ (ε7,840)

EXAMPLE 4

*6-dimethylamino-9-(3-acetamido-3-deoxy-β-D-ribofuranosyl)purine*

A mixture of 0.536 g. of 6-chloro-9-(2,5-O-benzoyl-3-acetamido-3-deoxy-D-ribofuranosyl)purine (prepared as in Example 3), 1 ml. of dimethylamine and 10 ml. of anhydrous methanol was heated in a sealed tube for 2 hours on a steam-bath. The resulting red-brown solution was evaporated to dryness under reduced pressure and the residual gum dissolved in aqueous ethanol and evaporated to dryness under reduced pressure. The residual gum was dissolved in 40 ml. of 50% methanol and 38.4 ml. of the resulting solution stirred with Amberlite IRA–400 (OH) resin. The resin was removed by filtration and the filtrate evaporated under reduced pressure to yield 0.304 g. (96%) of 6-dimethylamino-9-(3-acetamido-3-deoxy-D-ribofuranosyl)purine as a tan glass. Crystallization from 3A alcohol gave 0.165 g. (52%) of colorless crystals, M. P. 186–189° C., of 6-dimethylamino-9-(3-acetamido - 3 - deoxy-β-D-ribofuranosyl)purine; $[\alpha]_D^{25}$ −8.1° (pyridine);

$\lambda_{max.}^{0.1 N HCl}$ 267 mμ (ε17,700); $\lambda_{max.}^{ethanol}$ 275 mμ (ε17,500); $\lambda_{max.}^{0.1 N NaOH}$ 275 mμ (17,800)

EXAMPLE 5

*6-diethylamino-9-(3-acetamido-3-deoxy-β-D-ribofuranosyl)purine*

A mixture of 3.684 g. of 6-chloro-9-(2,5-di-O-benzoyl-3-acetamido-3-deoxy-D-ribofuranosyl)purine (prepared as in Example 3), 7.2 ml. of diethylamine and 35 ml. of anhydrous methanol was heated in a sealed tube for 2 hours on a steam-bath. The resulting dark red solution was evaporated to dryness under reduced pressure and the residue was evaporated to dryness under reduced pressure several times with aqueous ethanol. The dark brown crystalline residue was dissolved in 160 ml. of 50% methanol and the resulting solution stirred with Amberlite IRA–400 (OH) resin. The resin was removed by filtration and the filtrate evaporated to dryness under reduced pressure to yield 1.944 g. (78%) of 6-diethylamino-9-(3-acetamido-3-deoxy-D-ribofuranosyl)purine as a brown solid, M. P. 180–192° C. Recrystallization from 60 ml. of 3:1 ethyl acetate:anhydrous ethanol with the aid of Norit gave 1.165 g. (47%) of 6-diethylamino-9-(3-acetamido-3-deoxy-β-D-ribofuranosyl) purine as colorless crystals, M. P. 207–210° C. Recrystallization from 2:3 ethyl acetate:3A alcohol gave colorless crystals, M. P. 214.5–215° C. $[\alpha]_D^{24.5}$—26.0° (ethanol)

$\lambda_{max.}^{0.1 N\ HCl}$ 269 m$\mu$ ($\epsilon$19,400); $\lambda_{max.}^{ethanol}$ 277.5 m$\mu$ ($\epsilon$19,400); $\lambda_{max.}^{0.1 N\ NaOH}$ 278 m$\mu$ ($\epsilon$19,800)

EXAMPLE 6

*6-diethylamino-9-(3-amino-3-deoxy-β-D-ribofuranosyl)purine*

A solution of 0.500 g. of 6-diethylamino-9-(3-acetamido-3-deoxy-β-D-ribofuranosyl)purine (prepared as in example 5) in 50 ml. of 5% barium hydroxide was heated on a steam-bath for 1 hour. Excess carbon dioxide was added and the precipitated barium carbonate removed by filtration. The filtrate was evaporated to dryness under reduced pressure and the crystalline residue was dissolved in 15 ml. of 50% methanol. This solution was passed through a column of 10 g. of Amberlite IRC–50 (H) resin and the column washed with four 100-ml. portions of 50% methanol; the last eluate having negligible absorption at 277.5 m$\mu$. The combined eluates were evaporated to dryness under reduced pressure to yield 0.287 g. of recovered starting material. The resin column was washed with two 100-ml. and two 50-ml. portions of 1:1 methanol : 0.6 N ammonium hydroxide, the last eluate having negligible absorption at 275 m$\mu$. The combined eluates were evaporated to dryness under reduced pressure to yield 0.133 g. (30%) of 6-diethylamino-9-(3-amino-3-deoxy-β-D-ribofuranosyl)purine as tan crystals, M. P. 165–175° C. The recovered starting material was hydrolyzed with 5% barium hydroxide as above to yield an additional 0.085 g. (19%) of 6-diethylamino-9-(3-amino-3-deoxy-β-D-ribofuranosyl)purine as buff-colored crystals, M. P. 176–180° C. Twenty percent of the starting material was recovered. The product was recrystalized from 1:1 ethyl acetate:ethanol with the aid of Norit to yield colorless crystals, M. P. 181–183° C.; $[\alpha]_D^{24.5}$—45.8° (ethanol)

$\lambda_{max.}^{0.1 N\ HCl}$ 268 m$\mu$ ($\epsilon$19,700); $\lambda_{max.}^{ethanol}$ 277 m$\mu$ ($\epsilon$19,400); $\lambda_{max.}^{0.1 N\ NaOH}$ 277.5 m$\mu$ (20,000)

EXAMPLE 7

*6-methylamino-9-(3-amino-3-deoxy-β-D-ribofuranosyl)purine*

A mixture of 6.68 g. of 6-chloro-9-(2,5-di-O-benzoyl-3-phthalimido-3-deoxy-β-D-ribofuranosyl)purine (containing one-half mole of ethyl acetate and prepared as in Example 2), 4 g. of methylamine and 85 ml. of anhydrous methanol was heated in a sealed tube for 4 hours on a steam-bath. The resulting solution was chilled and filtered to remove colorless crystals which were washed with water and ether and air-dried. The yield of 6-methylamino-9-(3-amino-3-deoxy-β - D - ribofuranosyl) - purine as colorless crystals, M. P. 228–231° C. was 1.016 g. The combined filtrate and washings were evaporated under reduced pressure and the residue evaporated several times under reduced pressure with aqueous ethanol. A solution of the residual amber gum in 50% methanol was stirred with Amberlite IRA–400 (OH) resin for one-half hour. The resin was removed by filtration and the filtrate was evaporated to dryness under reduced pressure. The residue was crystallized from absolute ethanol to yield 1.109 g. of 6-methylamino-9-(3-amino-3-deoxy-β-D-ribofuranosyl)purine as colorless crystals, M. P. 224–230° C. Concentration of the the mother liquor afforded an additional 0.226 g. of product, M. P. 195–212° C. giving a total yield of 2.351 g. (84%). When recrystallized from aqueous ethanol colorless crystals were obtained, M. P. 228.5–230.5° C.; $[\alpha]_D^{24}$—29.6° (water);

$\lambda_{max.}^{0.1 N\ HCl}$ 262.5 m$\mu$ ($\epsilon$17,600); $\lambda_{max.}^{ethanol}$ 267.5 m$\mu$ ($\epsilon$16,000); $\lambda_{max.}^{0.1 N\ NaOH}$ 267.5 m$\mu$ (16,600)

EXAMPLE 8

*6-isobutylamino-9-(3-amino-3-deoxy-β-D-ribofuranosyl)purine*

A mixture of 4.29 g. of 6-chloro-9-(2,5-di-O-benzoyl-3-phthalimido-3-deoxy-β-D-ribofuranosyl)purine (containing one-fourth mole of ethyl acetate and prepared as in Example 2), 7.00 ml. of isobutylamine and 60 ml. of anhydrous methanol in a sealed tube was heated on a steam-bath for 6 hours. The resulting amber solution was evaporated to dryness under reduced pressure and the residue evaporated several times under reduced pressure with aqueous ethanol. The residue was treated with 20 ml. of 1:1 ethanol:water and filtered. The filtrate was stirred for 1 hour with 10 g. of Amberlite IRA–400 (OH) resin and then evaporated to dryness under reduced pressure and the crystalline residue evaporated several times under reduced pressure with absolute ethanol to yield 2.889 g. of tan crystalline residue. The residue was washed well with water and the water wash was evaporated to dryness under reduced pressure to a crystalline residue which was recrystallized from absolute ethanol to yield 0.953 g. of 6-isobutylamino-9-(3-amino - 3 - deoxy-β-D-ribofuranosyl) purine as colorless small plates, M. P. 172–173.2° C. The mother liquor yielded a further crop of crystals, giving a total of 1.200 g. (56%). Recrystallization from absolute ethanol produced colorless crystals, M. P. 171.5–172.5° C. $[\alpha]_D^{24}$—25.3° (water);

$\lambda_{max.}^{0.1 N\ HCl}$ 263.5 m$\mu$ ($\epsilon$19,000); $\lambda_{max.}^{EtOH}$ 268 m$\mu$ (17,700); $\lambda_{max.}^{0.1 N\ NaOH}$ 217 m$\mu$ ($\epsilon$11,000), 268.5 m$\mu$ (18,000)

EXAMPLE 9

*6-dimethylamino-9-(3-amino-3-deoxy-β-D-ribofuranosyl)purine*

A mixture of 0.969 g. of 6-chloro-9-(2,5-di-O-benzoyl-3-phthalimido-3-deoxy-β-D-ribofuranosyl)purine (containing one-half mole of ethyl acetate and prepared as in Example 2), 1.0 ml. of dimethylamine and 5 ml. of anhydrous methanol in a sealed tube was heated on a steam-bath for 6 hours. The tube was cooled and opened and 2.1 ml. of an anhydrous methanol solution of 0.24 g. of methylamine was added. The tube was resealed and heated on a steam-bath for 6 hours. Chilling produced nearly colorless crystals which were collected by centrifugation, washed with methanol, and dried under reduced pressure. The product, 0.368 g., M. P. 205–207° C., was recrystallized from absolute ethanol to give 0.258 g. of colorless crystals of 6-dimethylamino-9-(3-amino-3-deoxy-β-D-ribofuranosyl)purine, M. P. 214–216° C.

EXAMPLE 10

*6-(1-piperidyl)-9-(3-[o-(1-piperidylcarbonyl)benzamido]-3-deoxy-β-D-ribofuranosyl)purine*

A mixture of 6.68 g. of 6-chloro-9-(2,5-di-O-benzoyl-3-phthalimido-3-deoxy-β-D-ribofuranosyl)purine (containing one-fourth mole of ethyl acetate and prepared as in Example 2), 12.9 ml. of piperidine and 50 ml. of anhydrous methanol in a sealed tube was heated on a steam-bath for 6 hours. The resulting amber solution was evaporated under reduced pressure and the residual crystals and gum were evaporated under reduced pressure several times with aqueous ethanol, and finally with absolute ethanol. A solution in 100 ml. of 60% ethanol of the residue was stirred for 2 hours with 20 g. of Amberlite IRC–400 (OH) resin and the filtrate was evaporated to dryness under reduced pressure to yield a tan glass. The glass was triturated with ether and dried at 70° C. (0.01 mm.) to yield 3.609 g. (61%) of crude 6-(1-piperidyl)-9-

(3-[o-(1-piperidylcarbonyl)benzamido] - 3 - deoxy - β - D-ribofuranosyl)purine;

$\lambda_{max.}^{0.1 N HCl}$ 272.5 mμ (ε18,400); $\lambda_{max.}^{EtOH}$ 279 mμ (ε19,100); $\lambda_{max.}^{0.1 N NaOH}$ 280 mμ (ε19,200)

EXAMPLE 11

*6-(1-piperidyl)-9-(3-amino-3-deoxy-β-D-ribofuranosyl) purine*

A solution of 3.556 g. of 6-(1-piperidyl)-9-(3-[o-(1-piperidylcarbonyl)benzamido]-3-deoxy-β-D-ribofuranosyl) purine (prepared as in Example 10) and 1.026 g. of methylamine in 39 ml. of anhydrous methanol in a sealed tube was heated on a steam-bath for 6 hours. The cooled reaction mixture was filtered, removing 1.077 g. of 6-(1-piperidyl)-9-(3-amino-3-deoxy-β-D-ribofuranosyl)purine as colorless shiny small prisms, M. P. 189–191° C. Concentration of the mother liquor yielded an additional 0.244 g. of product, M. P. 188–191° C., giving a total yield of 61%.

Recrystallization from methanol yielded colorless crystals, M. P. 189.5–190° C., of the hemihydrate, $[\alpha]_D^{24}$ —44.0° (ethanol);

$\lambda_{max.}^{0.1 N HCl}$ 272.5 mμ (ε21,400); $\lambda_{max.}^{EtOH}$ 217.5 mμ (16,400), 280 mμ (ε22,500); $\lambda_{max.}^{0.1 N NaOH}$ 216.5 mμ (ε25,200), 281 mμ (ε22,400)

EXAMPLE 12

*6-dipropylamino-9-(3-amino-3-deoxy-β-D-ribofuranosyl) purine*

A mixture of 6.68 g. of 6-chloro-9-(2,5-di-O-benzoyl-3-phthalimido-3-deoxy-β-D-ribofuranosyl)purine (containing one-half mole of ethyl acetate and prepared as in Example 2), 13.8 ml. of dipropylamine and 60 ml. of anhydrous methanol in a sealed tube was heated on a steam-bath for 6 hours. The tube was cooled and opened and 15 ml. of an anhydrous methanol solution of 1.71 g. of methylamine was added. The tube was resealed and heated on a steam-bath for 6 hours. The resulting light tan solution was evaporated to dryness under reduced pressure, and the residue was evaporated to dryness under reduced pressure with aqueous ethanol. The residue was triturated with 300 ml. of 5:1 methanol:water, chilled and filtered. The filtrate was stirred for 1 hour with 15 g. of Amberlite IRA–400 (OH) resin and then evaporated to dryness under reduced pressure. The residue was triturated with methanol, chilled, filtered and washed with ethyl acetate to yield 1.093 g. of 6-dipropylamino-9-(3-amino-3-deoxy-β-D-ribofuranosyl)purine as colorless shiny plates, M. P. 168–169.5° C. Recrystallization from ethyl acetate yielded lustrous colorless plates, M. P. 168.5–169.5° C.; $[\alpha]_D^{24}$ —45.0° (methanol);

$\lambda_{max.}^{0.1 N HCl}$ 270 mμ (ε20,000); $\lambda_{max.}^{MeOH}$ 215 mμ (ε15,600), 277.5 mμ (ε20,400); $\lambda_{max.}^{0.1 N NaOH}$ 217.5 mμ (27,600), 280 mμ (ε20,500)

EXAMPLE 13

*Bis(2,6-dichloropurinyl)mercury*

To a solution of 37.7 ml. of 1 N sodium hydroxide and 100 ml. of water at 75° C., 7.14 g. of 2,6-dichloropurine was added rapidly with stirring. Then a hot solution of 10.24 g. of mercuric chloride in 30 ml. of ethanol was immediately added and the slurry rapidly chilled. The tan crystals were removed by filtration, washed with water and dried at 100° C. The yield of bis(2,6-dichloropurinyl)mercury was 11.41 g.

EXAMPLE 14

*2,6-dichloro-9-(2,5-di-O-benzoyl-3-phthalimido-3-deoxy-D-ribofuranosyl)purine*

To a stirred, refluxing suspension of 6.50 g. of bis (2,6-dichloropurinyl)mercury (prepared as in Example 13) in 100 ml. of xylene, a hot solution of 9.10 g. of 2,5 - di - O - benzoyl - 3 - phthalimido - 3-deoxy - β-D-ribofuranosyl chloride in 90 ml. of anhydrous xylene was added. The mixture was refluxed for 5 hours and filtered while hot. The small amount of precipitate was washed with hot chloroform and the combined filtrate and washings were cooled and washed with 30% potassium iodide and with water and dried over anhydrous magnesium sulfate. Evaporation under reduced pressure yielded 12.0 g. of 2,6-dichloro-9-(2,5-di-O-benzoyl-3-phthalimido-3-deoxy-D-ribofuranosyl)purine as a nearly colorless glass.

Crystallization from ethyl acetate-hexane yielded 6.51 g. (55%) of 2,6 - dichloro - 9 - (2,5 - di - O - benzoyl-3 - phthalimido - 3 - deoxy - D - ribofuranosyl)purine as colorless crystals, which sintered at 58–60° C. to an opaque glass and melted at 95–105° C. to a clear glass; $[\alpha]_D^{28}$ —57.0° (chloroform);

$\lambda_{max.}^{0.1 N HCl}$ 276 mμ (ε11,400); $\lambda_{max.}^{methanol}$ 275 mμ (ε11,400); $\lambda_{infl.}^{0.1 N NaOH}$ 260 mμ (ε9,360), 267.5 mμ (ε8,910)

EXAMPLE 15

*6-methylamino-9-(3-acetamido-3-deoxy-α and β-D-ribofuranosyl)purine*

A mixture of 5.708 g. of 6-chloro-9-(2,5-di-O-benzoyl-3-acetamido - 3 - deoxy-D-ribofuranosyl)purine (prepared as in Example 3), 3.35 g. of methylamine and 44 ml. of anhydrous methanol in a sealed tube was heated on a steam-bath for 2 hours. The dark red-brown solution was evaporated under reduced pressure and the residue was twice evaporated to dryness with water under reduced pressure. A solution of the residue in 100 ml. of 1:1 methanol:water was stirred for 1 hour with 15 g. of Amberlite IRA–400 (OH) resin and the filtered solution was evaporated to dryness under reduced pressure. The residue was evaporated to dryness several times with absolute ethanol under reduced pressure. The residue, 4.71 g., was crystallized from methanol to yield in two crops 0.869 g. of nearly colorless crystals, M. P. 210–219° C. Recrystallization from methanol yielded 0.145 g. of 6-methylamino - 9 - (3 - acetamido - 3 - deoxy-α - D - ribofuranosyl)purine as a colorless crystals, M. P. 250–255° C. (dec.). The combined methanol filtrates were evaporated to dryness under reduced pressure to yield a gummy residue which was partitioned on 120 g. of Celite in the system 5:1:1 chloroform:methanol: water; the column was eluted with the lower phase and thirty-four 10 ml. portions of eluate were collected. The column was then eluted with the lower phase of the system 5:2:1 chloroform:methanol:water, thirty-eight 10 ml. portions of eluate being collected; the column was finally eluted with methanol, a 176 ml. and twenty-two 10 ml. portions of eluate being collected. Combined eluates 34–64 were evaporated to dryness under reduced pressure to give 0.886 g. (26%) of tan crystals of 6-methylamino - 9 - (3 - acetamido - 3 - deoxy - β - D - ribofuranosyl)purine. When recrystallized several times from methanol, colorless crystals (containing one-fourth mole of water) were obtained, M. P. 229–230° C. (dec.); $[\alpha]_D^{28}$ —2.0° (water);

$\lambda_{max.}^{0.1 N HCl}$ 262.5 mμ (ε18,000); $\lambda_{max.}^{water}$ 265 mμ (ε16,700); $\lambda_{max.}^{0.1 N NaOH}$ 266 mμ (ε17,000)

Combined eluates 73 and 74 were evaporated to dryness under reduced pressure to yield 0.367 g. of 6-methylamino - 9 - (3 - acetamido - 3 - deoxy - α - D - ribofuranosyl)purine, giving a total of 0.512 g. (15%). Several recrystallizations from methanol yielded colorless needles (containing one-fourth mole of water), M. P. 257–258° C. (dec.); $[\alpha]_D^{28}$ +114.0° (water);

$\lambda_{max.}^{0.1 N HCl}$ 262.5 mμ (ε18,400); $\lambda_{max.}^{water}$ 264 mμ (ε17,900); $\lambda_{max.}^{0.1 N NaOH}$ 265 mμ (ε17,300)

EXAMPLE 16

*6-methylamino-9-(3-amino-3-deoxy-β-D-ribofuranosyl)purine*

A solution of 8.11 g. of 82.3% 6-methylamino-9-(3-acetamido-3-deoxy-D-ribofuranosyl)purine (prepared as in Example 15) in 150 ml. of saturated aqueous barium hydroxide was heated on a steam-bath for 1 hour. Excess carbon dioxide was added and the precipitated barium carbonate was removed by filtration. The filtrate was evaporated to dryness under reduced pressure and the residue was dissolved in 200 ml. of absolute ethanol, filtered to remove a precipitate, and evaporated to dryness under reduced pressure to yield a residual brown glass.

*Column I.*—A solution of the glassy residue in 30 ml. of 1:1 methanol:water was percolated through a column of Amberlite IRC-50 (H) resin and the resin column was washed with 800 ml. of 1:1 methanol:water, the final eluate showing negligible absorption at 275 mμ. The column was washed with 600 ml. of 1:1 methanol:0.6 N ammonium hydroxide, the final eluate showing negligible absorption at 277 mμ. Evaporation to dryness under reduced pressure of the methanol:0.6 N ammonium hydroxide eluate yielded 0.791 g. of residual crystals and glass.

*Column II.*—The 0.791 g. of residue from column I was partitioned on 26 g. of Celite in the system 20:1:4 ethyl acetate:methanol:water and the column successively washed with 80 ml., 70 ml. and 80 ml. of the upper phases of the systems 20:1:4, 10:1:2 and 20:3:4 ethyl acetate:methanol:water. The column was finally washed with methanol to elute two tan-colored bands. Evaporation of the methanol eluate yielded 0.489 g. of residue.

*Column III.*—The 0.489 g. of residue from column II was partitioned on 22 g. of Celite in the system 5:2:1 chloroform:methanol:water and the column was eluted with lower phase; eighteen 3.6 ml. portions of eluate were collected and evaporated to dryness. Eluates 8–18, containing a total of 0.235 g. of nearly colorless crystals, were combined and recrystallized from absolute ethanol to yield, in two crops, 0.178 g. (3%) of nearly colorless crystals of 6-methylamino-9-(3-amino-3-deoxy-β-D-ribofuranosyl)purine, M. P. 227–229° C. Recrystallization from absolute ethanol, with the aid of Norit, yielded colorless crystals, M. P. 230–231° C.; $[\alpha]_D^{25}$—26.9° (water);

$\lambda_{max.}^{0.1\,N\,HCl}$ 262 mμ ($\epsilon$17,100); $\lambda_{max.}^{ethanol}$ 266 mμ ($\epsilon$16,200); $\lambda_{max.}^{0.1\,N\,NaOH}$ 266 mμ ($\epsilon$16,300)

The methanol:water eluate of column I was evaporated to dryness under reduced pressure to yield 4.71 g. of a glassy residue which was rehydrolyzed with barium hydroxide as above.

*Column IV.*—The rehydrolysis product was partitioned on 115 g. of Celite in the system 5:2:1 chloroform:methanol:water, using lower phase to elute the column, and forty-five 15 ml. portions of eluate were collected. Combined eluates 20–32 were evaporated to dryness to yield 1.157 g. of crystalline residue which was recrystallized several times from absolute ethanol to yield 0.063 g. (1%) of colorless crystals of 6-methylamino-9-(3-amino-3-deoxy-β-D-ribofuranosyl)purine, M. P. 228–230° C.

*Column V.*—Combined eluates 8–18 of column IV were evaporated to dryness to yield 0.771 g. of residue which was partitioned on 28 g. of Celite in the system 6:4:1 butanol:water:acetic acid and the column was eluted with upper phase; twenty-two 2 ml. portions of eluate were collected. Combined eluates 6–16 were evaporated to dryness to yield 0.528 g. of residue which was crystallized from methanol to yield colorless crystals, M. P. 229–230° C., of recovered 6-methylamino-9-(3-acetamido-3-deoxy-β-D-ribofuranosyl)purine hemihydrate.

EXAMPLE 17

*6-diethylamino-9-(3-amino-3-deoxy-β-D-ribofuranosyl)purine*

A mixture of 1.000 g. of 6-chloro-9-(2,5-di-O-benzoyl-3-phthalimido-3-deoxy-β-D-ribofuranosyl)purine (containing one-third mole of ethyl acetate), 1.18 ml. of diethylamine and 25 ml. of anhydrous methanol was refluxed for 3 hours. Butylamine, 1 ml., was added and the resulting solution was refluxed for 3 hours. The cooled solution was stirred for 45 minutes with 5 g. of Amberlite IRA-400 (OH) resin and the filtered solution was evaporated to dryness under reduced pressure. The light tan residual solid was crystallized from 3A alcohol to yield colorless crystals of 6-diethylamino-9-(3-amino-3-deoxy-β-D-ribofuranosyl)purine which after washing with ethyl acetate and ether weighed 0.133 g. and had M. P. 179.5–181.5° C. The mother liquor was evaporated to dryness and the residue was washed with ethyl acetate and ether to yield an additional 0.106 g. of product as colorless crystals, M. P. 179.5–181° C. The combined crops were recrystallized from absolute ethanol and then from ethyl acetate-absolute ethanol to yield colorless crystals, M. P. 181.5–182.5° C.; $[\alpha]_D^{25}$—44.0° (ethanol);

$\lambda_{max.}^{0.1\,N\,HCl}$ 268 mμ ($\epsilon$18,200); $\lambda_{max.}^{ethanol}$ 276.5 mμ ($\epsilon$18,800); $\lambda_{max.}^{0.1\,N\,NaOH}$ 277 mμ ($\epsilon$19,300)

EXAMPLE 18

*6-dibutylamino-9-(3-amino-3-deoxy-β-D-ribofuranosyl)purine*

A mixture of 6.50 g. of 6-chloro-9-(2,5-di-O-benzoyl-3-phthalimido-3-deoxy-β-D-ribofuranosyl)purine (containing one-third mole of ethyl acetate), 9.7 g. of dibutylamine and 50 ml. of anhydrous methanol in a sealed tube was heated on a steam-bath for 1¾ hours. The cooled tube was opened, 5 ml. of butylamine was added, and the tube was resealed and heated on a steam-bath for 1¾ hours. The resulting amber solution was evaporated to dryness under reduced pressure and the crystalline residue was twice evaporated to dryness under reduced pressure with absolute ethanol. Recrystallization of the residue from absolute ethanol gave 1.144 g. of 6-dibutylamino-9-(3-amino-3-deoxy-β-D-ribofuranosyl)purine as colorless small plates, M. P. 189.5–190.5° C. The mother liquor was concentrated to a volume of 100 ml., diluted with 20 ml. of water, and the resulting solution stirred for 45 minutes with 25 g. of Amberlite IRA-400 (OH) resin. The filtered solution was evaporated under reduced pressure to a crystalline residue which was slurried with absolute ethanol and evaporated to dryness under reduced pressure. Recrystallization from absolute ethanol gave, in four crops, 1.067 g. of product as colorless small plates, M. P. 184.5–190° C. The combined crops were recrystallized from 3A alcohol to yield colorless crystals, M. P. 189.5–190.5° C.; $[\alpha]_D^{26}$—38.8° (methanol);

$\lambda_{max.}^{0.1\,N\,HCl}$ 271 mμ ($\epsilon$19,200); $\lambda_{max.}^{methanol}$ 279 mμ ($\epsilon$19,400); $\lambda_{max.}^{0.1\,N\,NaOH}$ 280 mμ ($\epsilon$19,600)

EXAMPLE 19

*6-furfurylamino-9-(3-amino-3-deoxy-β-D-ribofuranosyl)purine*

A solution of 5.73 g. of 6-chloro-9-(2,5-di-O-benzoyl-3-phthalimido-3-deoxy-β-D-ribofuranosyl)purine (containing one-half mole of ethyl acetate), 8.3 ml. of furfurylamine and 25 ml. of methyl Cellosolve was refluxed for 1 hour. The resulting amber solution was evaporated under reduced pressure to a brown gum, a solution of which in 9.9 ml. of butylamine and 25 ml. of anhydrous methanol was refluxed for 4¼ hours. The resulting brown solution was evaporated to residue under reduced pressure. A solution of the residue in 80 ml. of 80% ethanol was stirred for 1 hour with 20 g. of Amberlite IRA-400 (OH) resin. The filtered solution was evaporated to dryness under reduced pressure and the residual gum was evaporated under reduced pressure several times with absolute ethanol. The residue, consisting of brown crystals and gum, was crystallized from absolute ethanol to yield 0.814 g. of 6-furfurylamino-9-(3-amino-3-deoxy-β-D-ribofuranosyl)purine as nearly colorless crystals, M. P. 153° C. (gas). Recrystallization from 3A alcohol and then from ethyl acetate-absolute ethanol gave colorless crystals, M. P. 157.5–158.5° C.; $[\alpha]_D^{26} -43.5°$ (water);

$\lambda_{max.}^{0.1\ N\ HCl}$ 264 mμ (ε17,900); $\lambda_{max.}^{methanol}$ 267.5 mμ (ε18,400); $\lambda_{max.}^{0.1\ N\ NaOH}$ 268 mμ (ε19,200)

EXAMPLE 20

*6-benzylamino-9-(3-amino-3-deoxy-β-D-ribofuranosyl) purine*

A mixture of 6.68 g. of 6-chloro-9-(2,5-di-O-benzoyl-3-phthalimido-3-deoxy-β-D-ribofuranosyl)purine (containing one-half mole of ethyl acetate), 10.9 ml. of benzylamine and 65 ml. of anhydrous methanol in a sealed tube was heated on a steam-bath for 2 hours. The resulting solution was evaporated under reduced pressure to a residual gum, a solution of which in 240 ml. of methanol and 60 ml. of water was stirred for 1 hour with 20 g. of Amberlite IRA-400 (OH) resin. The filtered solution was evaporated under reduced pressure to a crystalline residue which was treated with absolute ethanol and filtered. The filtrate was evaporated under reduced pressure to a syrup which was crystallized from ethyl acetate-ether to yield 2.695 g. of nearly colorless crystals, M. P. 150–165° C. Several recrystallizations from absolute ethanol gave 6-benzylamino-9-(3-amino-3-deoxy-β-D-ribofuranosyl)purine as colorless crystals, M. P. 174.5–175.5° C.; $[\alpha]_D^{25} -41.8°$ (methanol);

$\lambda_{max.}^{0.1\ N\ HCl}$ 264 mμ (ε20,800); $\lambda_{max.}^{methanol}$ 270 mμ (ε20,600); $\lambda_{max.}^{0.1\ N\ NaOH}$ 270 mμ (ε21,200)

EXAMPLE 21

*6-methoxy-9-(3-phthalimido-3-deoxy-β-D-ribofuranosyl)-purine*

A solution of 2.00 g. of 6-chloro-9-(2,5-di-O-benzoyl-3-phthalimido-3-deoxy-β-D-ribofuranosyl)purine (containing one-third mole of ethyl acetate), 5 ml. of chloroform, 7.25 ml. of anhydrous methanol and 9.24 ml. of 1 N methanolic sodium methoxide was refluxed for 2 hours. The reaction mixture was then evaporated to dryness under reduced pressure. A suspension of the residue in 20 ml. of dimethylformamide and 0.438 ml. of glacial acetic acid was refluxed for 1 hour, cooled and filtered, and the filtrate was evaporated to dryness under reduced pressure. The residual tan crystals were washed with ethyl acetate and water to yield 0.749 g. of 6-methoxy-9-(3-phthalimido-3-deoxy-β-D-ribofuranosyl)purine as tan crystals, M. P. 229–231° C. (dec.). Repeated recrystallization from aqueous ethanol (with the aid of activated charcoal) gave colorless crystals, M. P. 243–244° (dec.); $[\alpha]_D^{26} -113.0°$ (methanol);

$\lambda_{max.}^{0.1\ N\ HCl}$ 222.5 mμ (ε37,900), 242.5 mμ (ε18,600); $\lambda_{max.}^{methanol}$ 220 mμ (ε35,100), 242.5 mμ (ε18,100); $\lambda_{max.}^{0.1\ N\ NaOH}$ 217.5 mμ (ε25,200), 247.5 mμ (ε15,500)

EXAMPLE 22

*6-diamylamino-9-(3-amino-3-deoxy-β-D-ribofuranosyl)-purine*

A mixture of 6.504 g. of 6-chloro-9-(2,5-di-O-benzoyl-3-phthalimido-3-deoxy-β-D-ribofuranosyl)purine (containing one-third mole of ethyl acetate), 11.8 g. of diamylamine and 50 ml. of anhydrous methanol in a sealed tube was heated on a steam-bath for 1¾ hours. The cooled tube was opened, 5 ml. of butylamine was added, and the tube was resealed and heated on a steam-bath for 2 hours. The resulting solution was evaporated to dryness under reduced pressure and the residue evaporated to dryness under reduced pressure twice with aqueous ethanol and once with absolute ethanol. Recrystallization of the residue from absolute ethanol gave 1.683 g. of 6-diamylamino-9-(3-amino-3-deoxy-β-D-ribofuranosyl)purine as colorless crystals, M. P. 171–172.5° C. The mother liquor was diluted with ethanol to 100 ml., 20 ml. of water was added, and the resulting solution was stirred for 1 hour with 20 g. of Amberlite IRA-400 (OH) resin. The filtered solution was evaporated to dryness under reduced pressure and the residue was triturated with ether to yield an additional 0.473 g. of product as colorless crystals, M. P. 164–167° C. The combined crops were recrystallized several times from absolute ethanol to yield colorless crystals, M. P. 172–173.2° C.; $[\alpha]_D^{26} -43.7°$ (ethanol);

$\lambda_{max.}^{0.1\ N\ HCl}$ 271 mμ (ε20,000); $\lambda_{max.}^{methanol}$ 279 mμ (ε20,600); $\lambda_{max.}^{0.1\ N\ NaOH}$ 280 mμ (ε20,400)

EXAMPLE 23

*6-diheptylamino-9-(3-amino-3-deoxy-β-D-ribofuranosyl)-purine*

A mixture of 3.74 g. of 6-chloro-9-(2,5-di-O-benzoyl-3-phthalimido-3-deoxy-β-D-ribofuranosyl)purine (containing one-half mole of ethyl acetate), 9.00 g. of diheptylamine and 50 ml. of anhydrous methanol in a sealed tube was heated on a steam-bath for 2¼ hours. The cooled tube was opened, 8 ml. of an anhydrous methanol solution of 0.91 g. of methylamine was added, and the tube was sealed and heated on a steam-bath for 2¾ hours. The resulting solution was evaporated to dryness under reduced pressure and the residue was evaporated to dryness under reduced pressure with aqueous ethanol and then with absolute ethanol. A solution of the residue in 100 ml. of methanol and 20 ml. of water was stirred for 1 hour with 25 g. of Amberlite IRA-400 (OH) resin, and the filtered solution was evaporated to residue under reduced pressure. Crystallization of the residue from ethyl acetate gave 0.641 g. of colorless crystals, M. P. 133–136° C. Evaporation under reduced pressure of the mother liquor and trituration of the residue with ether gave an additional 0.947 g. of product. The combined crops were recrystallized several times from absolute ethanol to give 6-diheptylamino-9-(3-amino-3-deoxy-β-D-ribofuranosyl)purine as colorless crystals, M. P. 137–138°; $[\alpha]_D^{25} -36.9°$ (ethanol);

$\lambda_{max.}^{0.1\ N\ HCl}$ 271 mμ (ε19,700); $\lambda_{max.}^{ethanol}$ 278 mμ (ε20,000); $\lambda_{max.}^{0.1\ N\ NaOH}$ 276 mμ (ε16,200)

EXAMPLE 24

*6-mercapto-9-(2,5-di-O-benzoyl-3-phthalimido-3-deoxy-β-D-ribofuranosyl) purine*

A mixture of 1.000 g. of 6-chloro-9-(2,5-di-O-benzoyl-3-phthalimido-3-deoxy-β-D-ribofuranosyl)purine (containing one-third mole of ethyl acetate), 0.129 g. of thiourea and 25 ml. of absolute ethanol was heated to boiling to give a colorless solution. On cooling a yellow precipitate was deposited which was gradually replaced by nearly colorless crystals. After one week at room temperature the product was removed by filtration, washed with absolute ethanol and ether, and dried at 100° C. The yield of 6-mercapto-9-(2,5-di-O-benzoyl-3-phthalimido-3-deoxy-β-D-ribofuranosyl)purine as nearly colorless crystals, M. P. 233–238° C. (the melting point was dependent on the rate of heating), was 0.817 g.; $[\alpha]_D^{26} -105.0°$ (pyridine);

$\lambda_{max.}^{0.1\ N\ HCl}$ 222 mμ (ε68,800), 322.5 mμ (ε25,400); $\lambda_{max.}^{methanol}$ 220 mμ (ε67,200), 321 mμ (ε21,400); $\lambda_{max.}^{0.1\ N\ NaOH}$ 217.5 mμ (ε54,900), 312 mμ (ε22,600)

EXAMPLE 25

2 - chloro - 6 - dipropylamino - 9 - (3 - amino - 3 - deoxy-D-ribofuranosyl)purine A mixture of 5.93 g. of 2,6-dichloro-9-(2,5-di-O-benzoyl - 3 - phthalimido - 3 - deoxy - D - ribofuranosyl) purine, 12.4 ml. of dipropylamine and 50 ml. of anhydrous methanol in a sealed tube was heated on a steambath for 2 hours. The cooled tube was opened, 4.5 ml. of butylamine was added, and the tube was sealed and heated on a steambath for 2 hours. The resulting solution was evaporated to dryness under reduced pressure and the residue was evaporated to dryness under reduced pressure with aqueous ethanol and then absolute ethanol. A solution of the gummy residue in 100 ml. of 3:1 methanol: water was stirred for 1 hour with 25 g. of Amberlite IRA-400 (OH) resin, and the resin was removed by filtration and washed well with hot methanol. The combined filtrate and washings were evaporated to dryness under reduced pressure, and the residue was evaporated to dryness under reduced pressure several times with absolute ethanol. Crystallization of the glass from 2:1 methanol: water gave 1.840 g. of colorless crystals, M. P. 93–103° C. Recrystallization from ethyl acetate gave 0.061 g. of 2-chloro-6-dipropylamino-9-(3-amino-3-deoxy-D-ribofuranosyl)purine as colorless crystals, M. P. 161–164° C. Further chilling of the aqueous methanolic mother liquor gave, in two crops, 1.562 g. of crude product, M. P. 138–158° C. Several recrystallizations from ethyl acetate gave pure product as lustrous colorless plates, M. P. 164.5–165.5° C.; $[\alpha]_D^{25}$—23.6° (ethanol);

$\lambda_{max.}^{0.1\,N\,HCl}$ 219 m$\mu$ ($\epsilon$18,900), 283 m$\mu$ ($\epsilon$20,400); $\lambda_{max.}^{methanol}$ 219 m$\mu$ ($\epsilon$20,300), 281 m$\mu$ ($\epsilon$21,600); $\lambda_{max.}^{0.1\,N\,NaOH}$ 217.5 m$\mu$ ($\epsilon$30,400), 282.5 m$\mu$ ($\epsilon$21,000)

EXAMPLE 26

6-methylmercapto-chloromercuripurine

A hot solution of 6.502 g. of mercuric chloride in 25 ml. of ethanol was added to a hot solution of 3.979 g. of 6-methylmercaptopurine in 100 ml. of water and 23.94 ml. of 1 N sodium hydroxide to produce a colorless precipitate. To the hot suspension 12.00 g. of diatomaceous earth was added, the suspension was chilled and filtered, and the precipitate was washed with water and dried at 100° C. The precipitate, 21.69 g., contained 9.69 g. of 6-methyl-mercapto-chloromercuripurine.

EXAMPLE 27

6 - methylmercapto - 9 - (2,5 - di - O - benzoyl - 3 - phthalimido-3-deoxy-D-ribofuranosyl)purine To a stirred, refluxing suspension of 4.34 g. of 6-methylmercapto-chloromercuripurine and 5.38 g. of diatomaceous earth in 165 ml. of xylene, freed from traces of water by refluxing into a moisture point receiver, a hot solution of 5.06 g. of 2,5-di-O-benzoyl-3-phthalimido-3-deoxy-β-D-ribofuranosyl chloride in 50 ml. of xylene was added. The resulting colorless suspension was stirred and refluxed for 6 hours, filtered while hot, and the precipitate was washed with hot chloroform. The combined filtrate and wash were washed with two 25-ml. portions of 30% potassium iodide and two 50-ml. portions of water. The organic solution was evaporated under reduced pressure at 70° C. to yield 6.580 g. of crude 6-methylmercapto-9-(2,5 - di - O - benzoyl - 3 - phthalimido - 3 - deoxy - D-ribofuranosyl)purine as a nearly colorless glass. Crystallization from absolute ethanol-chloroform gave 4.76 g. of colorless crystals, M. P. 193–196° C. Several recrystallizations from absolute ethanol-chloroform gave colorless crystals, M. P. 195.5–196.5° C. (partially melts at 157–159° C. and resolidifies); $[\alpha]_D^{25}$—88.4° (chloroform);

$\lambda_{max.}^{0.1\,N\,HCl}$ 222 m$\mu$ ($\epsilon$79,600), 285 m$\mu$ ($\epsilon$24,000), 291 m$\mu$ ($\epsilon$23,400); $\lambda_{max.}^{ethanol}$ 220 m$\mu$ ($\epsilon$64,600), 283 m$\mu$ ($\epsilon$23,800), 290 m$\mu$ ($\epsilon$22,200); $\lambda_{max.}^{0.1\,N\,NaOH}$ 217 m$\mu$ ($\epsilon$64,600), 287.5 m$\mu$ ($\epsilon$17,800), 294 m$\mu$ ($\epsilon$17,700)

EXAMPLE 28

9-(2,5-di-O-benzoyl-3-phthalimido-3-deoxy-D-ribofuranosyl)purine

A solution of 1.000 g. of 6-methylmercapto-9-(2,5-di-O - benzoyl - 3 - phthalimido - 3 - deoxy - D - ribofuranosyl)purine in 100 ml. of methyl Cellosolve was stirred with 3 tspns. of Raney nickel while heating on a steam-bath for 45 minutes. While hot, the suspension was filtered through diatomaceous earth and the precipitate was washed well with hot methyl Cellosolve. The combined filtrate and wash were evaporated under reduced pressure to yield 0.458 g. of a pale yellow glass. Crystallization from ethyl acetate-heptane gave 0.210 g. of 9 - (2,5 - di - O - benzoyl - 3 - phthalimido - 3 - deoxy-D-ribofuranosyl)purine, M. P. 115–119° C. Recrystallization from ethyl acetate-hexane and then from 3A alcohol gave the hydrate as colorless crystals, M. P. 117.5–122° C.; $[\alpha]_D^{25}$—61.7° (chloroform);

$\lambda_{max.}^{0.1\,N\,HCl}$ 223.5 m$\mu$ ($\epsilon$64,100), 306 m$\mu$, broad ($\epsilon$3,180); $\lambda_{infl.}^{0.1\,N\,HCl}$ 265 m$\mu$ ($\epsilon$8,800); $\lambda_{max.}^{ethanol}$ 221.5 m$\mu$ ($\epsilon$66,500), 262.5 m$\mu$ ($\epsilon$9,500), 300 m$\mu$ broad ($\epsilon$2,280); $\lambda_{infl.}^{ethanol}$ 282.5 m$\mu$ ($\epsilon$3,940); $\lambda_{max.}^{0.1\,N\,NaOH}$ 262.5 m$\mu$ ($\epsilon$9,500)

EXAMPLE 29

6 - decylamino - 9 - (3 - amino - 3 - deoxy - β - D - ribofuranosyl)purine

A mixture of 2.00 g. of 6-chloro-9-(2,5-di-O-benzoyl-3-phthalimido - 3 - deoxy-β-D-ribofuranosyl)purine (containing one third mole of ethyl acetate), 3.63 g. of decylamine and 50 ml. of anhydrous methanol was refluxed for 3½ hours. The resulting solution was cooled to room temperature, diluted with 10 ml. of water and stirred with 10 g. of Amberlite IRA-400 (OH) resin for 1 hour (additional methanol was added to prevent the product from crystallizing). The filtered solution was evaporated under reduced pressure and the residue was distilled several times with water under reduced pressure. The viscous residue was treated with methanol and filtered. The filtrate was evaporated to dryness under reduced pressure and the residue was refluxed with ether and filtered to yield 0.383 g. of 6-decylamino-9-(3-amino-3-deoxy-β-D-ribofuranosyl)purine as colorless crystals, M. P. 137–141° C. Several recrystallizations from absolute ethanol (with the aid of activated charcoal) gave colorless crystals. M. P. 138–139° C.; $[\alpha]_D^{25}$—40.0° (ethanol);

$\lambda_{max.}^{0.1\,N\,HCl}$ 263 m$\mu$ ($\epsilon$19,800); $\lambda_{max.}^{ethanol}$ 268 m$\mu$ ($\epsilon$18,000) $\lambda_{max.}^{0.1\,N\,NaOH}$ 268.5 m$\mu$ ($\epsilon$17,700)

EXAMPLE 30

6-diallylamino-9-(3-amino-3-deoxy-β-D-ribofuranosyl)purine

A mixture of 6.50 g. of 6-chloro-9-(2,5-di-O-benzoyl-3-phthalimido-3-deoxy-β-D-ribofuranosyl)purine (containing one-third mole of ethyl acetate), 7.3 g. of diallylamine and 50 ml. of anhydrous methanol in a sealed tube was heated on a steam-bath for 3¼ hours. The cooled tube was opened, 5 ml. of butylamine was added, and the tube was resealed and heated on a steam-bath for 2 hours. The resulting solution was evaporated under reduced pressure to a brown syrup which was evaporated several times under reduced pressure with aqueous ethanol. A solution of the residual brown syrup in 75 ml. of ethanol and 25 ml. of water was stirred for 1 hour with 20 g. of Amberlite IRA-400 (OH) resin. The filtered solution was evaporated under reduced pressure. The residual crystals and gum were triturated with ether and then diluted with ethyl acetate. Filtration gave 1.114 g. of 6-diallylamino-9-(3-amino-3-deoxy-β-D-ribofuranosyl)purine as colorless crystals, M. P. 158–161° C. The mother liquor deposited an additional 0.217 g. of product, M. P. 154–159° C. Recrystallization from ethyl acetate and ethanol-ethyl acetate gave colorless crystals, M. P. 161–163.5° C.; $[\alpha]_D^{25}$ —43.1° (methanol); $\lambda_{max.}^{0.1\,N\,HCl}$ 269 m$\mu$ ($\epsilon$19,400); $\lambda_{max.}^{methanol}$ 276 m$\mu$ ($\epsilon$21,800); $\lambda_{max.}^{0.1\,N\,NaOH}$ 277 m$\mu$ ($\epsilon$21,300)

EXAMPLE 31

*6 - (4 - morpholinyl) - 9 - (3-[o-(4-morpholinylcarbonyl) benzamido]-3-deoxy-β-D-ribofuranosyl) purine*

A mixture of 6.68 g. of 6-chloro-9-(2,5-di-O-benzoyl-3-phthalimido-3-deoxy-β-D-ribofuranosyl)purine (containing one-half mole of ethyl acetate), 11.3 ml. of morpholine and 50 ml. of anhydrous methanol in a sealed tube was heated on a steam-bath for 6 hours. The resulting brown solution was evaporated under reduced pressure to a residual glass which was twice dissolved in aqueous ethanol and evaporated to dryness under reduced pressure. A solution of the residue in 75 ml. of 2:1 methanol:water was stirred for 1 hour with 15 g. of Amberlite IRA-400 (OH) resin, filtered, and stirred for one-half hour with 15 g. of resin. The filtered solution was evaporated to dryness under reduced pressure and the residue was twice evaporated to dryness under reduced pressure to yield 3.53 g. of 6-(4-morpholinyl)-9-(3-[o-(4-morpholinylcarbonyl)benzamido]-3-deoxy-β-D-ribofuranosyl)purine as a light tan glass; $[\alpha]_D^{24}$ —16.6° (ethanol);

$\lambda_{max.}^{0.1\,N\,HCl}$ 277 m$\mu$ ($\epsilon$15,800); $\lambda_{max.}^{ethanol}$ 278 m$\mu$ ($\epsilon$17,700); $\lambda_{max.}^{0.1\,N\,NaOH}$ 280 m$\mu$ ($\epsilon$18,000)

EXAMPLE 32

*6-butylamino-9-(3-amino-3deoxy-β-D-ribofuranosyl) purine*

A mixture of 4.00 g. of 6-chloro-9-(2,5-di-O-benzoyl-3 - phthalimido -3- deoxy-β-D-ribofuranosyl)purine (containing one-third mole of ethyl acetate), 4 ml. of butylamine and 100 ml. of anhydrous methanol was refluxed for 3 hours. The resulting solution was diluted with 20 ml. of water and stirred for 1 hour with 20 g. of Amberlite IRA-400 (OH) resin. The filtered solution was evaporated to dryness under reduced pressure. The residual solid was recrystallized from absolute ethanol to yield, after washing with ether, 0.202 g. of 6-butylamino-9-(3-amino-3-deoxy-β-D-ribofuranosyl)purine as colorless crystals, M. P. 171–172° C. Concentration of the mother liquor gave, in three crops, an additional 0.453 g. of product. Recrystallization from absolute ethanol, ethyl acetate and methanol gave the product as colorless crystals containing one-fourth mole of water; $[\alpha]_D^{25}$ —43.7° (ethanol);

$\lambda_{max.}^{0.1\,N\,HCl}$ 262 m$\mu$ ($\epsilon$19,200); $\lambda_{max.}^{ethanol}$ 269 m$\mu$ ($\epsilon$17,300); $\lambda_{max.}^{0.1\,N\,NaOH}$ 269 m$\mu$ ($\epsilon$17,600)

EXAMPLE 33

*6-cyclohexylamino-9-(3-amino-3-deoxy-β-D-ribofuranosyl) purine*

A mixture of 6.504 g. of 6-chloro-9-(2,5-di-O-benzoyl-3 - phthalimido -3- deoxy-β-D-ribofuranosyl)purine (containing one-third mole of ethyl acetate), 11.5 ml. of cyclohexylamine and 50 ml. of anhydrous methanol in a sealed tube was heated on a steam-bath for 2⅓ hours. The resulting solution was evaporated to dryness under reduced pressure and the residue was evaporated to dryness under reduced pressure several times with aqueous ethanol and then with absolute ethanol. A solution of the residual brown glass in 125 ml. of 4:1 methanol:water was stirred for 1 hour with 20 g. of Amberlite IRA-400 (OH) resin. The filtered solution was evaporated to dryness under reduced pressure to yield 5.74 g. of residual tan glass. A mixture of 5.67 g. of the tan glass, 4.5 ml. of butylamine and 50 ml. of anhydrous methanol in a sealed tube was heated on a steam-bath for 2 hours. The resulting amber solution was evaporated to dryness under reduced pressure to a tan semi-solid residue. A solution of the residue in 75 ml. of 3:1 ethanol:water was percolated through a column of 25 g. of Amberlite IRC-50 (H) resin and the column was washed with 938 ml. of 3:1 ethanol:water, the final percolate having a negligible absorption of 269 m$\mu$. The column was then washed with 606 ml. of 3:1 ethanol:2 N ammonium hydroxide, the final percolate having negligible absorption at 269 m$\mu$. The ethanol:2 N ammonium hydroxide percolate was evaporated under reduced pressure to yield 1.880 g. of a nearly colorless glass. The glass was partitioned on 240 g. of diatomaceous earth in the system 6:1:2 ethyl acetate:heptane:water and the column was eluted with upper phase. The eluate was measured spectrophotometrically at 269 m$\mu$ and two peaks were observed. The portions of eluate containing the second absorbing peak were combined and evaporated to dryness under reduced pressure to yield 1.390 g. of 6-cyclohexylamino-9-(3-amino-3-deoxy-β-D-ribofuranosyl)purine as a colorless glass; $[\alpha]_D^{25}$ —42.5° (ethanol);

$\lambda_{max.}^{0.1\,N\,HCl}$ 263 m$\mu$ ($\epsilon$19,500); $\lambda_{max.}^{ethanol}$ 270 m$\mu$ ($\epsilon$17,300); $\lambda_{max.}^{0.1\,N\,NaOH}$ 270 m$\mu$ ($\epsilon$17,900)

EXAMPLE 34

*6-chloro-9-(2,3-di-O-benzoyl-5-phthalimido-5-deoxy-β-D-ribofuranosyl) purine*

To a solution of 200 cc. of hydrogen chloride in ether (saturated at 0°) was added 4.83 g. of 1-O-acetyl-2,3-di-O-benzoyl-5-phthalimido-5-deoxy-β-D-ribofuranose and the resulting solution was allowed to stand at —3° C. for three days. It was then evaporated to dryness under reduced pressure at room temperature and the residual gum was dissolved in 20 cc. of anhydrous xylene and was added to a suspension of 3.55 g. of 6-chloropurine mercuric chloride reaction product and 2.12 g. of diatomaceous earth in 300 cc. of anhydrous xylene. The mixture was stirred and refluxed for three hours and was then filtered while still hot. The precipitate was washed with a little chloroform and the washings were added to the original filtrate. This solution was evaporated under reduced pressure and the residue was taken up in a mixture of 20 cc. of a 30% aqueous potassium iodide solution and 120 cc. of chloroform. The layers were separated and the organic phase was washed with another 15 cc. of the potassium iodide solution and then with 20 cc. of water. The chloroform solution was dried and partially decolorized with magnesium sulfate and charcoal and was then filtered. The filtrate was evaporated under reduced pressure and the residue was dried in a desiccator under reduced pressure to afford 5.45 g. of yellow glass. This was dissolved in 20 cc. of benzene and added to the top of a column containing 125 g. of acid washed alumina and benzene (column dimensions 3 x 17 cm.). The column was washed with anhydrous benzene and the washings were discarded. Elution was then carried out with a mixture of 20% ethyl acetate in benzene and a total of ten 100-cc. fractions were collected. These fractions were pooled and evaporated to afford 3.55 g. of 6-chloro-9-(2,3-di-O-benzoyl - 5 - phthalimido - 5 - deoxy-β-D-ribofuranosyl)purine as a colorless, fluffed glass. The substance is soluble in chloroform, ethyl acetate and benzene. It is somewhat soluble in ether or ethanol and is insoluble in water.

EXAMPLE 35

*6-amino-9-(5-amino-5-deoxy-β-D-ribofuranosyl) purine*

A mixture of 1 g. of 6-chloro-9-(2,3-di-O-benzoyl-5-phthalimido-5-deoxy-β-D-ribofuranosyl)purine and 30 cc. of methanolic ammonia (saturated at 0° C.) was heated in a stainless steel bomb on a steam-bath for 50 minutes with occasional shaking. The bomb was allowed to cool and was opened and there was added 10 cc. of a solution of 0.067 mole of methylamine in methanol. The bomb was closed and was again heated on the steam-bath for 1 hour. It was allowed to cool and the contents were collected and evaporated under reduced pressure. The residue was mixed with water and with ether. The layers were separated and the water phase was extracted with another portion of ether. The ether fractions were discarded and the dark brown water solution was filtered through a layer of activated charcoal. The filtrate was added to the top of a column containing Amberlite IRC–50 (H) resin. The column was washed with 1 liter of water and the washings were discarded. The column was then washed with 250 cc. of 2 N ammonium hydroxide solution followed by 250 cc. of water. These two fractions were combined and evaporated under reduced pressure at a bath temperature below 45° C. The residue (300 mg.) was dissolved in 2 cc. of the lower phase of a butanol-water mixture and the solution was mixed intimately with 4 g. of diatomaceous earth. This mixture was added to the top of a column of 60 cc. of diatomaceous earth which had been well mixed with 30 cc. of the aqueous phase of the butanol-water mixture. The column was developed with the upper phase of this solvent system and the effluent was checked with a recording ultraviolet spectrophotometer set at 260 m$\mu$. This showed that adenosine-like material started to be washed off the column after 100 cc. of the solvent had run through. Fractions containing this material (about 90 cc.) were pooled and evaporated to yield 200 mg. of amorphous material. This was purified by solution in methanol and filtration through a layer of activated charcoal. The filtrate was concentrated to a small volume and ethyl acetate was added at the boiling point to give 5 cc. of solution. Ether was added until the solution became cloudy and the solid which precipitated out on standing was collected and was washed with more ether. A second portion of solid could be obtained by evaporating the filtrate to a small volume and adding more ether. The combined solids were dried under reduced pressure to afford 0.164 g. of 6-amino-9-(5-amino-5-deoxy-$\beta$-D-ribofuranosyl)purine as a white amorphous solid, $\lambda_{max.}^{ethanol}$ 260 m$\mu$ ($\epsilon$13,180)

The compound is soluble in ethanol, methanol and water. It is only slightly soluble in ethyl acetate and is insoluble in ether or hexane.

EXAMPLE 36

*6-chloro-9-(5-amino-5-deoxy-$\beta$-D-ribofuranosyl)purine*

To a solution of 1.0 g. of 6-chloro-9-(2,3-di-O-benzoyl-5-phthalimido-5-deoxy-$\beta$-D-ribofuranosyl)purine in 6 cc. of hot n-propanol was added 0.6 cc. of hydrazine hydrate and the mixture was heated on a steam-bath for about 5 minutes. The dark suspension was filtered and the precipitate was washed with a little methanol. The filtrate was evaporated under reduced pressure and the residue was taken up in water and the filtered solution was passed into a column of Amberlite IRC–50 (H) resin. The column was washed with 1 liter of water and the washings were discarded. Elution of the column with 2 N ammonium hydroxide (500 cc.) afforded a light red solution which was evaporated under reduced pressure at a bath temperature of 45° C. The dried residue was a pink powder which weighed 0.16 g. This was dissolved in 1.5 cc. of the upper phase and 1.5 cc. of the lower phase of a butanol-water mixture and the solution was mixed with 3 g. of diatomaceous earth. This was packed on the top of a column consisting of 60 g. of diatomaceous earth and 30 cc. of the lower phase of the butanol-water system. The column was washed with the upper phase of this solvent system and the effluent was allowed to pass through a recording ultraviolet spectrophotometer which had been set at 264 m$\mu$. Material showing absorption at this wave length was eluted after 100 cc. of solvent had passed through the column. Fractions containing this material were pooled (95 cc.) and evaporated under reduced pressure at 45° C. The residue (0.07 g.) was taken up in 3 cc. of anhydrous methanol and filtered through charcoal. Dilution of the filtrate with ether brought down a precipitate which was collected and washed with ether by centrifugation to afford 6-chloro-9-(5-amino-5-deoxy-$\beta$-D-ribofuranosyl)purine as an amorphous solid. The substance is soluble in ethanol, isopropanol and water and is insoluble in ether and hexane.

EXAMPLE 37

*9 - (2,3 - di - O - benzoyl - 5 - phthalimido - 5 - deoxy - $\beta$ - D - ribofuranosyl)purine*

A solution of 0.9 g. of 6-chloro-9-(2,3-di-O-benzoyl-5-phthalimido-5-deoxy-$\beta$-D-ribofuranosyl)purine in 15 cc. of methyl Cellosolve was added to 0.12 g. of magnesium oxide and 0.1 g. of 10% palladium on charcoal catalyst. The stirred mixture was reduced with hydrogen under atmospheric pressure. When the hydrogen uptake slowed down, the mixture was filtered and another batch of magnesium oxide and of the palladium catalyst was added. This was repeated once more. When the calculated amount of hydrogen had been taken up, the reduction was stopped and the mixture was filtered. The filtrate was evaporated under reduced pressure and the residue was dissolved in 80 cc. of methylene chloride. This solution was washed with several small portions of water and was then dried over magnesium sulfate, filtered and freed from solvent under reduced pressure. The residue (0.82 g.) was crystallized from a mixture of ether and methylene chloride to afford 0.542 g. of 9-(2,3-di-O-benzoyl - 5 - phthalimido - 5 - deoxy - $\beta$ - D - ribofuranosyl)purine, M. P. 153–155° C. The compound is soluble in methylene chloride, ethyl acetate and ethanol but is insoluble in water or in hexane.

EXAMPLE 38

*9-(5-amino-5-deoxy-$\beta$-D-ribofuranosyl)purine*

To a suspension of 1 g. of 9-(2,3-di-O-benzoyl-5-phthalimido-5-deoxy-$\beta$-D-ribofuranosyl)purine in 10 cc. of n-propanol was added 0.9 cc. of hydrazine hydrate and the mixture was heated on a steambath for five minutes. All of the solid went into solution as soon as heat was applied to the flask and another solid precipitated out as the reaction proceeded. After the 5 minute heating period, the mixture was allowed to cool and was filtered. The precipitate was washed with a little methanol and was discarded. The washings and filtrate were combined and evaporated to a volume of about 20 cc. and this solution was added to the top of a column of Amberlite IRC–50 (H) resin. The column was washed with 1 liter of water and the washings were discarded. The column was then washed with 250 cc. of 2 N aqueous ammonium hydroxide and with 150 cc. of water. These fractions were combined and evaporated under reduced pressure. The residue (0.19 g.) was dissolved in 2 cc. of the lower phase and 2 cc. of the upper phase of a butanol-water mixture and the solution was mixed intimately with 4 g. of diatomaceous earth. This was added to a column prepared from 60 g. of diatomaceous earth which had been mixed with 30 cc. of the lower phase of the butanol-water mixture. The dimensions of the completed column were 54 cm. x 2 cm. The column was washed with the upper phase of the solvent system and the effluent was allowed to pass through a recording ultraviolet spectrophotometer which had been set at 260 m$\mu$. After some 100 cc. of solvent had passed through the column, material which absorbed at this wave length started to come off. All fractions containing this substance were collected, pooled and evaporated under reduced pressure to afford 0.1 g. of glass. This was dissolved in methanol passed through a layer of charcoal and the filtrate was once more evaporated. This residue was crystallized from a mixture of ethyl acetate and ether. There was obtained 0.044 g. of 9-(5-amino-5-deoxy-$\beta$-D-ribofuranosyl)purine which decomposed slowly between 148–155° C. (depending on the rate of heating);

$$\lambda_{max.}^{methanol}\ 263\ m\mu\ (\epsilon 6,640)$$

The compound is soluble in ethanol and water. It is somewhat soluble in ethyl acetate and insoluble in ether.

EXAMPLE 39

*Ethyl 2 - acetamido - 2 - deoxy - 3,5,6 - tri - O - benzoyl - α - D - glucothiofuranoside*

In 3 cc. of reagent pyridine there was dissolved 0.50 g. of ethyl 2-acetamido-2-deoxy-α-D-glucothiofuranoside and the solution was cooled to 0–5° C. After the addition of 0.73 cc. of benzoyl chloride the reaction mixture was allowed to remain at 5° C., protected from atmospheric moisture, for 3 days. The dark solution was poured on 50 cc. of ice-water and was extracted with chloroform. The chloroform was washed with excess saturated sodium bicarbonate solution, then water, and dried over magnesium sulfate. The chloroform solution was filtered and evaporated to dryness under reduced pressure leaving a light orange gum which was clarified by activated charcoal in ether solution to give, on evaporation under reduced pressure, 1.0 g. of ethyl 2-acetamido - 2 - deoxy - 3,5,6 - tri - O - benzoyl - α - D - glucothiofuranoside as a colorless gum. Recrystallization from aqueous ethanol gave colorless crystals, M. P. 113–114° C.

EXAMPLE 40

*2-acetamido-2-deoxy-3,5,6-tri-O-benzoyl-D-glucofuranose*

A suspension of 6.9 g. of ethyl 2-acetamido-2-deoxy-3,5,6 - tri - O - benzoyl - α - D - glucothiofuranoside and 20.0 g. of mercuric oxide in 69.0 cc. of acetone and 6.9 cc. of water was prepared. The mixture was magnetically stirred while a solution of 18.6 g. of mercuric chloride was added dropwise over 2 hours. After stirring for 48 hours at room temperature the mercuric oxide was removed by filtration through diatomaceous earth and the filtrate was evaporated to dryness under reduced pressure leaving a gum. The gum was dissolved in 15 cc. of water and extracted twice with 10 cc. portions of chloroform. The chloroform layer was separated and washed with 10 cc. of 30% potassium iodide and two 15 cc. portions of water. After drying over magnesium sulfate the chloroform solution was evaporated to dryness under reduced pressure leaving 6.0 g. of 2-acetamido-2-deoxy-3,5,6-tri-O-benzoyl-D-glucofuranose as a yellow gum which gave a positive Benedict test and showed 76.5% free sugar by the Hanes modification of the Hegadorn-Jensen procedure.

EXAMPLE 41

*1 - O - acetyl - 2 - acetamido - 2 - deoxy - 3,5,6 - tri - O - benzoyl - D - glucofuranose*

To a solution of 0.5 g. of 2-acetamido-2-deoxy-3,5,6-tri-O-benzoyl-D-glucofuranose in 5 cc. of pyridine was added 5 cc. of acetic anhydride and the solution was allowed to remain at room temperature, protected from atmospheric moisture, for 18 hours. After pouring on 50 cc. of ice-water the mixture was extracted several times with chloroform. The chloroform extracts were combined and washed with excess saturated sodium bicarbonate and then with water. After drying over magnesium sulfate the chloroform solution was evaporated to dryness under reduced pressure leaving a dark gum which was clarified by treating with activated charcoal in absolute ether. On reevaporation 450 mg. of 1-O-acetyl-2-acetamido - 2 - deoxy - 3,5,6 - tri - O - benzoyl - D - glucofuranose was obtained as a light yellow gum.

EXAMPLE 42

*6-chloro-9-(2-acetamido-2-deoxy-3,5,6-tri-O-benzoyl-β-D-glucofuranosyl)purine*

In 25 cc. anhydrous ether, saturated at 0° C. with hydrogen chloride, 2.0 g. of 1-O-acetyl-2-acetamido-2-deoxy-3,5,6-tri-O-benzoyl-D-glucofuranose was dissolved. Then 2.0 cc. of acetyl chloride was added. The resulting solution was kept at −5° C., protected from atmospheric moisture, for 3 days and then was evaporated to dryness under reduced pressure at a water bath temperature of 40–45° C. Reagent benzene was added and evaporation was repeated leaving a light pink solid, M. P. 78–82° C., dec. In 250 cc. of xylene there was suspended 2.7 g. of 6-chloropurine mercuric chloride reaction product and there was removed by distillation about 80 cc. of xylene. To the mixture with magnetic slurring was added the above light pink solid and the whole reaction was stirred for 3 hours in refluxing xylene. After filtration the filtrate on evaporation to dryness under reduced pressure gave a gum which was redissolved in chloroform and washed with 30% potassium iodide. After one water wash the chloroform solution was evaporated to dryness leaving 2.0 g. of 6-chloro-9-(2-acetamido-2-deoxy-3,5,6-tri-O-benzoyl-β-D-glucofuranosyl)purine as a dark brown gum.

EXAMPLE 43

*6-dimethylamino-9-(2-acetamido-2-deoxy-β-D-glucofuranosyl)purine*

A solution of 2.0 g. of 6-chloro-9-(2-acetamido-2-deoxy-3,5,6-tri-O-benzoyl-β-D-glucofuranosyl)purine, 3 cc. of dimethylamine and 25 ml. of reagent methanol in a steel autoclave was heated for 2 hours on a steam-bath, cooled and the contents evaporated to dryness under reduced pressure. The resulting gum was dissolved in 25 cc. of water and impurities were removed by filtration and extraction of the filtrate with ether. On evaporation of the aqueous solution to dryness under reduced pressure there remained 0.8 g. of 6-dimethylamino-9-(3-acetamido - 3 - deoxy-β-D-glucofuranosyl)purine, U. V. maxima: 268 mμ (pH1), 278 mμ (pH7), 278 mμ (pH14).

EXAMPLE 44

*1,2,4,6-tetra-O-acetyl-3-acetamido-3-deoxy-D-allopyranoside*

To a solution of 25 g. of methyl 2,4,6-tri-O-acetyl-3-acetamido-3-deoxy-α-D-allopyranoside and 250 cc. of acetic anhydride cooled in an ice-bath was added 5 cc. of concentrated sulfuric acid dropwise with shaking. The stoppered solution was allowed to stand at room temperature for 7 days. The reaction mixture was poured into approximately 1300 cc. of ice-water and stirred for approximately 30 minutes to decompose the acetic anhydride. The solution was saturated with sodium chloride and extracted with three 200 cc. portions of chloroform. The combined extracts were dried with anhydrous magnesium sulfate, filtered, and the filtrate was evaporated to dryness under reduced pressure. The residue was evaporated three times with toluene, leaving 20.8 g. of 1,2,4,6-tetra-O-acetyl-3-acetamido - 3 - deoxy - D - allopyranoside as a buff colored syrup.

EXAMPLE 45

*6-chloro-9-(2,4,6-tri-O-acetyl-3-acetamido-3-deoxy-β-D-allopyranosyl)purine*

A mixture of 19.7 g. of 6-chloropurine mercuric chloride reaction product, 17.8 g. of diatomaceous earth, 20.7 g. of 3-amino-3-deoxy-D-allopyranoside pentaacetate and 750 cc. of ethylene dichloride was freed from traces of water by distillation of 100 cc. of solvent. To the somewhat cooled, stirred mixture was added a solution of 6.4 cc. of titanium tetrachloride in 100 cc. of ethylene dichloride over a period of about 2 minutes. The mixture was refluxed and stirred for 20 hours, then diluted with 400 cc. of 1 N hydrochloric acid and stirred for 1 hour without further heating. The mixture was filtered and the filter cake washed with hot chloroform. The organic layer was separated from the combined filtrate and washings, then evaporated to dryness under reduced pressure. A solution of the residue in 100 cc. of chloroform was washed with 100 cc. of 30% aqueous potassium iodide followed by water. After being dried with anhydrous magnesium sulfate, the solution was evaporated to dryness under reduced pressure leaving 5.5 g. of 6-chloro-9-(2,4,6-tri-O-acetyl - 3 - acetamido - 3 - deoxy-β-D-allopyranosyl)purine as a glass.

EXAMPLE 46

*6-dimethylamino-9-(3-acetamido-3-deoxy-β-D-allopyranosyl)purine*

A solution of 5.5 g. of 6-chloro-9-(2,4,6-tri-O-acetyl-3-acetamido-3-deoxy-β-D-allopyranosyl)purine, 120 cc. of absolute methanol and 8 cc. of anhydrous dimethylamine, contained in a steel bomb was heated on a steam-bath for 2 hours. The solution was then evaporated to dryness under reduced pressure leaving 5 g. of 6-dimethylamino-9-(3-acetamido-3-deoxy - β - D - allopyranosyl) purine as a brown syrup;

$\lambda_{max.}^{0.1 N\ HCl}$ 268 m$\mu$ ($\epsilon$6,200); $\lambda_{max.}^{ethanol}$ 278 m$\mu$ ($\epsilon$6,600); $\lambda_{max.}^{0.1 N\ NaOH}$ 279 m$\mu$ ($\epsilon$6,600)

We claim:
1. A method of preparing aminodeoxyglycosidopurines of the formula:

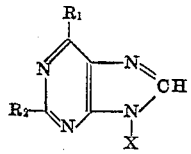

wherein R$_1$ and R$_2$ are members of the group consisting of halogen, hydrogen, alkyl, hydroxyl, alkoxy, aralkyloxy, mercapto, alkylmercapto, amino, alkylamino, mononuclear arylamino, aralkylamino, heterocyclicalkylamino, dialkylamino, pentamethyleneimino, oxapentamethyleneimino, dialkenylamino and cycloalkylamino radicals, and wherein X is an aminodeoxyglycosido radical, the amino group of which is substituted with a member of the group consisting of hydrogen, acyl and aroyl radicals, and the exocyclic oxygen atoms of which are substituted with a member of the group consisting of hydrogen, acyl and aroyl radicals, which comprises: reacting an aminodeoxyglycosidopurine of the above formula which contains at least one replaceable group in the R$_1$ and R$_2$ positions selected from the group consisting of halogen and alkoxy with a compound of the group consisting of ammonia, aliphatic, primary and secondary amines, aromatic amines, aralkylamines, heterocyclicalkylamines, pentamethyleneimines, oxapentamethyleneimines, dialkenylamines, cycloalkylamines, alkoxides, aralkoxides, thioalkoxides, thiourea, and inorganic bases so as to replace at least one R group and whereby the acyl and aroyl groups on the exocyclic oxygen atoms are removed.

2. A method as in claim 1 in which the replacement reaction is carried out in the presence of a hydroxylated organic solvent at a temperature of from 20 to 200° C.

3. A process as in claim 1 in which the reacting aminodeoxyglycosidopurine is 6-chloro-9-(2,5-di-O-benzoyl-3-phthalimido-3-deoxy-β-D-ribofuranosyl)purine.

4. A process as in claim 1 in which the reacting aminodeoxyglcosidopurine is 6-chloro-9-(2,5-di-O-benzoyl-3-acetamido-3-deoxy-D-ribofuranosyl)purine.

5. A process as in claim 1 in which the reacting aminodeoxyglycosidopurine is 2,6-dichloro-9-(2,5-di-O-benzoyl-3-phthalimido-3-deoxy-D-ribofuranosyl)purine.

6. A process as in claim 1 in which the reacting aminodeoxyglycosidopurine is 6-methoxy-9-(3-phthalimido-3-deoxy-β-D-ribofuranosyl)purine.

7. A process as in claim 1 in which the reacting aminodeoxyglycosidopurine is 6-chloro-9-(2,3 - di - O-benzoyl-5-phthalimido-5-deoxy-β-D-ribofuranosyl)purine.

8. A process as in claim 1 in which the reacting aminodeoxyglycosidopurine is 6-chloro-9-(2,4,6-tri-O-acetyl-3-acetamido-3-deoxy-β-D-allopyranosyl)purine.

9. A process as in claim 1 in which the reactant is ammonia.

10. A process as in claim 1 in which the reactant is a monosubstituted aliphatic amine.

11. A process as in claim 1 in which the amine is methylamine.

12. A process as in claim 1 in which the amine is a disubstituted aliphatic amine.

13. A process as in claim 12 in which the amine is dimethylamine.

14. A process as in claim 12 in which the amine is dipropylamine.

15. A process as in claim 1 in which the reactant is an alkoxide.

16. A process as in claim 15 in which the alkoxide is sodium methoxide.

17. A process as in claim 1 in which the reactant is an aralkoxide.

18. A process as in claim 1 in which the reactant is thiourea.

19. A process as in claim 1 in which the reactant is an inorganic base.

20. In a process of preparing aminodeoxyglycosidopurines, the step which comprises reacting an aminodeoxyglycosidopurine substituted in the 2- and 6-positions by at least one replaceable group selected from the group consisting of halogen and alkoxy, the amino group of which is substituted with a phthaloyl radical and the exocyclic oxygen atoms of which are substituted with a member of the group consisting of acyl and aroyl radicals, with a primary amine in the presence of a hydroxylated organic solvent whereby the acyl and aroyl radicals on the exocyclic oxygen atoms are removed.

21. A process according to claim 20 in which the amine is a primary aliphatic amine.

22. A process according to claim 20 in which the solvent is methanol.

23. In a process of preparing aminodeoxyglycosidopurines, the step which comprises reacting an aminodeoxyglycosidopurine substituted in the 2- and 6-positions by at least one replaceable group selected from the group consisting of halogen and alkoxy, the amino group of the aminodeoxyglycosidopurine being substituted with a member of the group consisting of hydrogen, acyl and aroyl radicals and the exocyclic oxygen atoms of which are substituted with a member of the group consisting of acyl an aroyl radicals, with a member of the group consisting of primary and secondary amines in the presence of a hydroxylated organic solvent whereby the acyl and aroyl groups on the exocyclic oxygen atoms are removed.

References Cited in the file of this patent

UNITED STATES PATENTS

| | | |
|---|---|---|
| 607,028 | Fischer | July 12, 1898 |
| 2,746,961 | Hitchings | May 22, 1956 |